United States Patent
Fleming, III

(10) Patent No.: US 6,654,804 B1
(45) Date of Patent: Nov. 25, 2003

(54) METHOD AND APPARATUS FOR AUTOMATIC DIAL-UP DIAL-DOWN WEB HOSTING

(75) Inventor: Hoyt A. Fleming, III, Boise, ID (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 09/560,661

(22) Filed: Apr. 27, 2000

(51) Int. Cl.[7] .............................................. G06F 15/173
(52) U.S. Cl. ........................ 709/224; 709/226; 370/235; 370/392
(58) Field of Search .................................. 709/224, 226; 370/235, 231, 392; 455/452.2

(56) References Cited

U.S. PATENT DOCUMENTS

| | | | | |
|---|---|---|---|---|
| 5,719,854 A | * | 2/1998 | Choudhury et al. | 370/231 |
| 6,119,011 A | * | 9/2000 | Borst et al. | 455/452.2 |
| 6,459,682 B1 | * | 10/2002 | Ellesson et al. | 370/235 |
| 6,502,131 B1 | * | 12/2002 | Vaid et al. | 709/224 |
| 6,577,628 B1 | * | 6/2003 | Hejza | 370/392 |
| 2001/0044845 A1 | * | 11/2001 | Cloonan et al. | 709/226 |

* cited by examiner

*Primary Examiner*—Wen-Tai Lin
(74) *Attorney, Agent, or Firm*—Park, Vaughan & Fleming LLP

(57) ABSTRACT

One embodiment of the present invention provides a system that automatically adjusts a web hosting service plan for a web site based upon measured usage of the web site. The system measures the usage statistics of the web site, compares the usage statistics against a set of available service plans for the web site, determines if staying with the current service plan results in a lowest cost, and switches the service plan to the plan with the lowest cost if applicable. In one embodiment of the present invention, the service plan specifies a fixed cost for a maximum amount of bandwidth, and an additional cost for additional bandwidth over the maximum bandwidth. In one embodiment of the present invention, the system measures the following usage statistics: bandwidth resulting from access to the web site, disk space used by the web site, response time of the web site, and memory space used by the web site.

21 Claims, 2 Drawing Sheets

METHOD AND APPARATUS FOR AUTOMATIC DIAL-UP DIAL-DOWN WEB HOSTING

BACKGROUND

1. Field of the Invention

The present invention relates to computers and the hosting of web sites. More specifically, the present invention relates to a method and apparatus for determining the most cost effective service plan for hosting a web site, and automatically switching to that service plan.

2. Related Art

The advent of e-commerce has led to the rapid expansion of the Internet and the web hosting business. The number of new web sites continues to grow exponentially. In addition, hundreds of new services are being created and offered daily. Making heads or tails of this can be a daunting task for the new-comer as well as the seasoned veteran in this electronic arena.

Currently, web hosting customers must select the type of web hosting account that they desire. They must consider numerous variables when choosing a web hosting plan. These variables range from the amount of bandwidth that the web site is going to consume, to the amount of disk space and memory that the web site is going to utilize, and to the amount of lag time that the system will allow before sending its content to the user.

The main problem with this situation involves choosing the service plan that best fits the user's needs. When entering into a web hosting agreement, it is difficult to anticipate the future requirements of a web site. How much bandwidth is needed? How much disk space is required for the web site? If these were static numbers, then the answer would be simple. Once all of the numbers are known, informed decision can be made, and the user is able to revise the service plan accordingly. Unfortunately, the web is dynamic in nature, and what might be the proper fit for today might not be appropriate tomorrow or next week. As this dynamic evolves, it takes dedicated observation and foresight to determine if changes need to be made, and to proactively implement those changes.

What is needed in this situation is a method and an apparatus that measures the statistics of a web site and compares those numbers against the set of available service plans in order to select the most cost effective service plan for hosting the web site.

SUMMARY

One embodiment of the present invention provides a system that automatically adjusts a web hosting service plan for a web site based upon measured usage of the web site. The system measures the usage statistics of the web site, compares the usage statistics against a set of available service plans for the web site, determines if staying with the current service plan results in a lowest cost, and switches the service plan to the plan with the lowest cost if applicable.

In one embodiment of the present invention, the service plan specifies a fixed cost for a maximum amount of bandwidth, and an additional cost for additional bandwidth over the maximum bandwidth.

In one embodiment of the present invention, the system measures the following usage statistics: bandwidth resulting from accesses to the web site, disk space used by the web site, response time of the web site, and memory space used by the web site.

In one embodiment of the present invention, the system switches service plans automatically.

In one embodiment of the present invention, the system switches service plans by notifying a user of the intended switch and by receiving a request back from the user to execute the switch.

In one embodiment of the present invention, the acts of measuring, comparing, determining, and switching are performed automatically by a computer system, without human intervention.

In one embodiment of the present invention, the system additionally accepts a selection of the current service plan from the set of available service plans.

In one embodiment of the present invention, the system additionally accepts a selection of the current service plan from the set of available service plans by setting an upper threshold for a fixed periodic cost for the current service plan and/or by setting a lower threshold for the fixed periodic cost for the current service plan.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
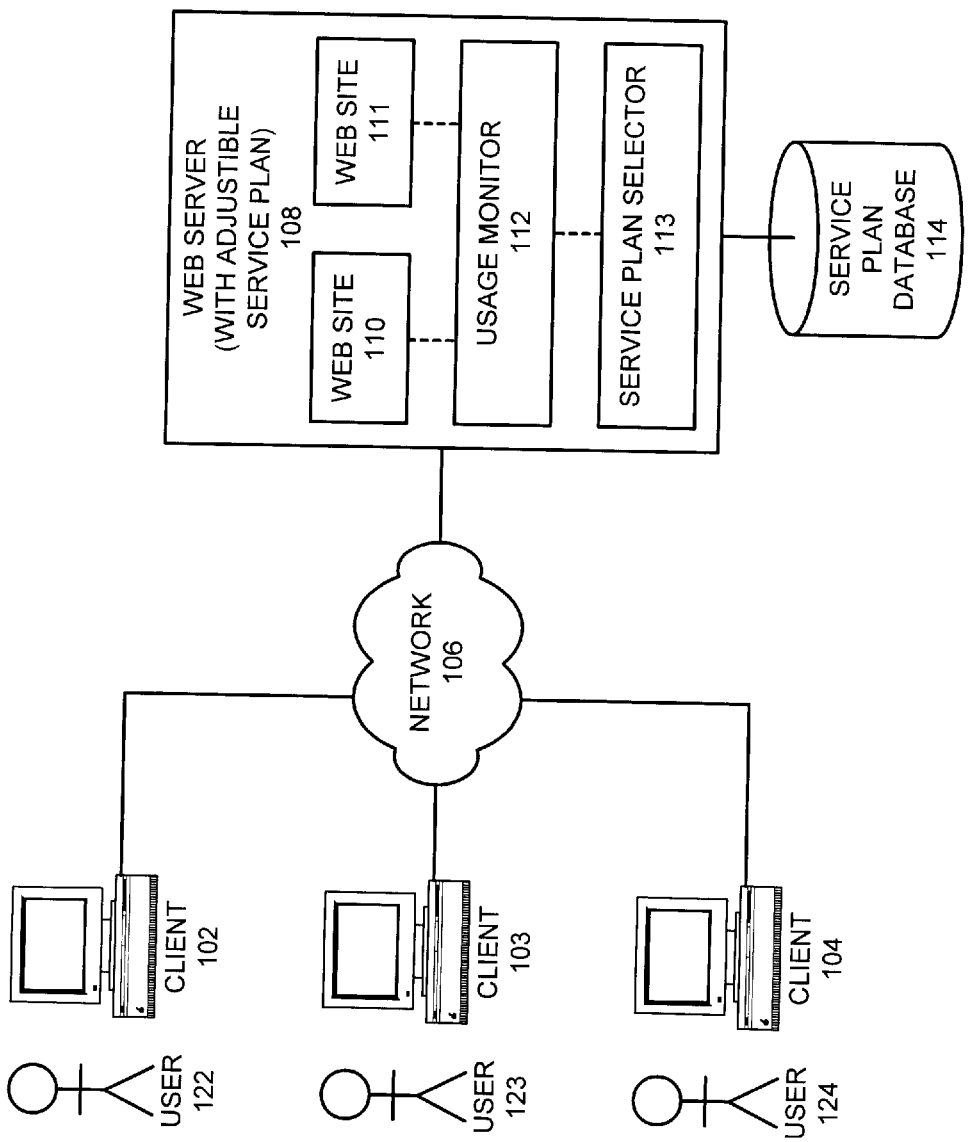
FIG. 1 illustrates computer systems coupled together by a network including the web server with the adjustable service plan mechanism in accordance with an embodiment of the present invention.

FIG. 1 illustrates computer systems 102–104 and 108 coupled together by network 106 in accordance with an embodiment of the present invention. Network 106 can include any type of wire or wireless communication channel capable of coupling together computer systems. This includes, but is not limited to, a local area network, a wide area network, or a combination of networks. In one embodiment of the present invention, network 106 includes the Internet. Network 106 can also include a communication pathway through a telephone line.

Note that computer systems 102–104 and 108 can generally include any type of computer system, including, but not limited to, a computer system based on a microprocessor, a mainframe computer, a digital signal processor, a personal organizer, a device controller, a cellular phone, and a computational engine within an appliance.

The computer systems illustrated in FIG. 1 include clients 102–104 and web server 108. Clients 102–104 can include any node on a network including computational capability and including a mechanism for communicating across network 106. In one embodiment of the present invention, clients 102–104 include web browsers (not shown) for communicating with web sites 110–111 on web server 108. These browsers can include any type of web browser capable of viewing a web site, such as the INTERNET EXPLORER™ browser distributed by the Microsoft Corporation of Redmond, Wash.

Web server 108 can include any computational node including a mechanism for servicing requests from a client for computational and/or data storage resources. Web server 108 includes web sites 110–111, usage monitor 112, and service plan selector 113. Web sites 110–111 can include inter-linked pages of textual and graphical information that can be navigated through by web browsers on clients 102–104. Usage monitor 112 includes mechanisms for monitoring usage statistics for web sites 110–111. This includes monitoring statistics on disk space usage, bandwidth, memory usage and processor usage of web sites 110–111. Data from usage monitor 112 feeds into service plan selector 113. Service plan selector 113 includes a mechanism to dynamically change a service plan for a web site as the usage statistics for the web site change over time.

Web server 108 is coupled with service plan database 114 that contains a set of available service plans. Note that service plan database 114 may exist within another computer system, such as web server 108, or may exist in a stand-alone computer system.

Process of Changing Service Plans

Figure 2:
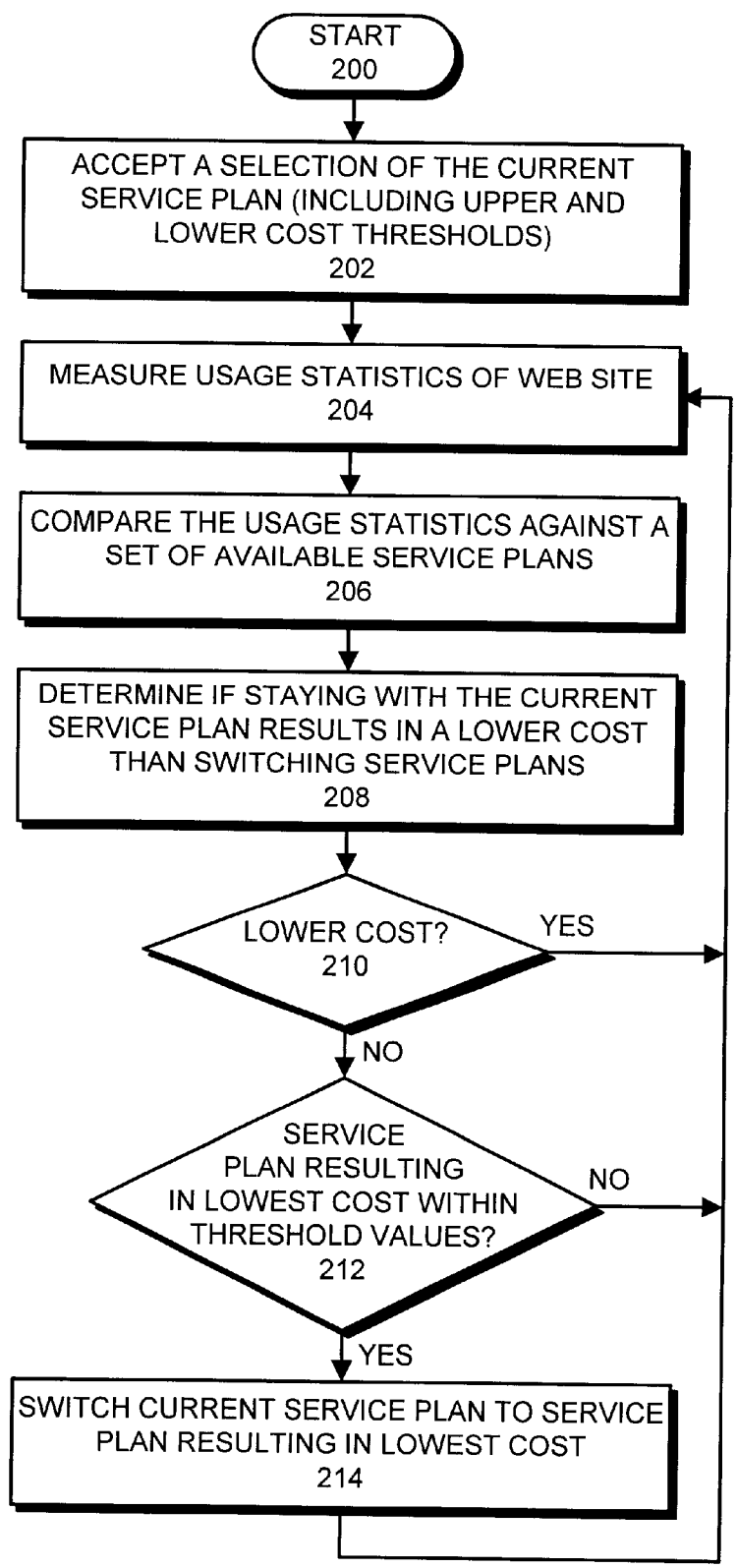
FIG. 2 is a flow chart illustrating the process of measuring the usage statistics of a web site, determining if a service plan change should be made, and implementing the change in accordance with an embodiment of the present invention.

FIG. 2 is a flow chart illustrating how the current service plan is determined in accordance with an embodiment of the present invention. Note that this process can take place at a number of different locations, including within web server 108 or at any other computer system that is capable of performing the process. Alternatively, the process can be split up between multiple computer systems.

In one embodiment of the present invention, the system starts by accepting a selection of the current service plan by a user for a web site (such as web site 110) (step 202). This current service plan may specify a fixed cost for a maximum bandwidth and an additional cost for additional bandwidth over the maximum bandwidth.

The process of selecting a current service plan may involve selecting an upper threshold for a fixed monthly cost for the service plan and a lower threshold for the fixed monthly cost. Note that the user is typically interested in fixing the upper threshold, whereas the hosting service provider is typically interested in fixing the lower threshold.

After this initial selection process, the system uses usage monitor 112 to measure usage statistics for web site 110 (step 204). These usage statistics may include the bandwidth resulting from accesses web site 110, the disk space used by web site 110, the response time for accesses to web site 110 and the memory space used by web site 110.

Next, the system compares the measured usage statistics against the set of available service plans contained in service plan database 114 (step 206) to determine if staying with the current service plan results in a lower cost than switching to an alternative service plan (step 208). If staying with the current service plan results in the lowest cost, then the system returns to step 204 to continue to measure usage statistics for the web site.

If staying with the current service plan does not result in the lowest cost, the system determines if the new service plan is within the threshold values (step 212). If the new service plan is within the threshold values, the system switches the service plans (step 214) and continues to measure usage statistics for the web site (step 204). Note that the process of switching service plans may involve notifying the user that another service plan may result in a lower cost, and allowing the user to determine whether or not to switch service plans. If the new service plan is not within the threshold values, the system returns to step 204 to continue to measure usage statistics for the web site.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically adjusting a web hosting service plan for a web site based upon measured usage of the web site, comprising:

measuring usage statistics of the web site;

comparing the usage statistics against a set of available service plans for the web site;

determining if staying with a current service plan from the set of available service plans results in a lower cost than switching from the current service plan; and if staying with the current service plan does not result in the lowest cost, switching the current service plan to a second service plan from the set of available service plans which results in the lowest cost, wherein switching the current service plan further comprises notifying a user that the second service plan may result in a lower cost, and receiving a request to switch to the second service plan from the user.

2. The method of claim 1, wherein the current service plan specifies a fixed cost for a maximum amount of bandwidth, and an additional cost for additional bandwidth over the maximum bandwidth.

3. The method of claim 1, wherein measuring the usage statistics of the web site includes:

measuring a bandwidth resulting from access to the web site;

measuring disk space used by the web site;

measuring a response time of the web site; and measuring memory space used by the web site.

4. The method of claim 1, wherein the process of switching the current service plan takes place automatically, without human intervention.

5. The method of claim 1, wherein the acts of measuring, comparing, determining, and switching are performed automatically by a computer system, without human intervention.

6. The method of claim 1, further comprising initially accepting a selection of the current service plan from the set of available service plans.

7. The method of claim 6, wherein initially accepting a selection of the current service plan from the set of available service plans further comprises accepting the selection of one of:

an upper threshold for a fixed periodic cost for the current service plan; and a lower threshold for the fixed periodic cost for the current service plan.

8. A computer-readable storage medium storing instructions that when executed by a computer cause the computer to perform a method for automatically adjusting a web hosting service plan for a web site based upon measured usage of the web site, the method comprising:

measuring usage statistics of the web site;

comparing the usage statistics against a set of available service plans for the web site;

determining if staying with a current service plan from the set of available service plans results in a lower cost than switching from the current service plan; and if staying with the current service plan does not result in the lowest cost,
switching the current service plan to a second service plan from the set of available service plans which results in the lowest cost, wherein switching the current service plan further comprises notifying a user that the second service plan may result in a lower cost, and receiving a request to switch to the second service plan from the user.

9. The computer-readable storage medium of claim 8, wherein the current service plan specifies a fixed cost for a maximum amount of bandwidth, and an additional cost for additional bandwidth over the maximum bandwidth.

10. A The computer-readable storage medium of claim 8, wherein measuring the usage statistics of the web site includes:

measuring a bandwidth resulting from access to the web site;

measuring disk space used by the web site;

measuring a response time of the web site; and measuring memory space used by the web site.

11. The computer-readable storage medium of claim 8, wherein the process of switching the current service plan takes place automatically, without human intervention.

12. The computer-readable storage medium of claim 8, wherein the acts of measuring, comparing, determining, and switching are performed automatically by a computer system, without human intervention.

13. The computer-readable storage medium of claim 8, further comprising initially accepting a selection of the current service plan from the set of available service plans.

14. The computer-readable storage medium of claim 13, wherein initially accepting a selection of the current service plan from the set of available service plans further comprises accepting the selection of one of:

an upper threshold for a fixed periodic cost for the current service plan; and a lower threshold for the fixed periodic cost for the current service plan.

15. An apparatus that automatically adjusts a web hosting service plan for a web site based upon measured usage of the web site, comprising:

a measuring mechanism that measures the usage statistics of the web site;

a comparison mechanism that compares the usage statistics against a set of available service plans for the web site;

a replacement mechanism that is configured to determine if staying with a current service plan from the set of available service plans results in a lower cost than switching from the current service plan; and a switching mechanism that is configured to switch the service plan to a second service plan from the set of available service plans that results in the lowest cost if the current service plan does not result in the lowest cost, wherein the switching mechanism is configured to switch the current service by comprising notifying a user that the second service plan may result in a lower cost, and receiving a request to switch to the second service plan from that user.

16. The apparatus of claim 15, wherein the service plan specifies a fixed cost for a maximum amount of bandwidth, and an additional cost for additional bandwidth over the maximum bandwidth.

17. The apparatus of claim 15, wherein the measuring mechanism is configured to measure the usage statistics of the web site including:

measuring a bandwidth resulting from access to the web site;

measuring disk space used by the web site;

measuring a response time of the web site; and measuring memory space used by the web site.

18. The apparatus of claim 15, wherein the replacement mechanism is configure to switch the current service plan automatically, without human intervention.

19. The apparatus of claim 15, wherein the measuring mechanism, the comparison mechanism, and the replacement mechanism are configured to operate automatically, without human intervention.

20. The apparatus of claim 15, further comprising an initialization mechanism that is configured to accept an initial selection of the current service plan from the set of available service plans.

21. The apparatus of claim 20, wherein the initialization mechanism is additionally configured to accept one of:

an upper threshold for a fixed periodic cost for the current service plan; and a lower threshold for the fixed periodic cost for the current service plan.

* * * * *